(12) United States Patent
Watanabe et al.

(10) Patent No.: US 7,393,898 B2
(45) Date of Patent: Jul. 1, 2008

(54) BLOCK COPOLYMER COMPOSITION

(75) Inventors: Jun Watanabe, Machida (JP); Hiroyuki Kurimura, Machida (JP); Shigeru Suzuki, Machida (JP); Takeshi Oda, Machida (JP); Norihiro Shimizu, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/566,372

(22) PCT Filed: Jul. 28, 2004

(86) PCT No.: PCT/JP2004/011099

§ 371 (c)(1),
(2), (4) Date: Nov. 30, 2006

(87) PCT Pub. No.: WO2005/010096

PCT Pub. Date: Feb. 3, 2005

(65) Prior Publication Data

US 2007/0093601 A1 Apr. 26, 2007

(30) Foreign Application Priority Data

Jul. 28, 2003 (JP) ............................. 2003-280660

(51) Int. Cl.
*C08F 297/04* (2006.01)
(52) U.S. Cl. ..................... 525/89; 525/98; 525/314; 525/316
(58) Field of Classification Search ............... 525/89, 525/98, 314, 316
See application file for complete search history.

(56) References Cited

U.S. PATENT DOCUMENTS 4,049,595 A * 9/1977 Dominguez .............. 524/426
6,265,484 B1 * 7/2001 Trepka et al. ............. 525/98

FOREIGN PATENT DOCUMENTS

| EP | 0646 607 A2 * | 5/1995 |
|---|---|---|
| JP | 52-78260 | 7/1977 |
| JP | 53-286 | 1/1978 |
| JP | 57-28150 | 2/1982 |
| JP | 7-173232 | 7/1995 |
| JP | 7-216186 | 8/1995 |
| JP | 7-238207 | 9/1995 |
| JP | 2003-1766 | 1/2003 |

OTHER PUBLICATIONS

U.S. Appl. No. 10/566,372, filed Jan 30, 2006, Watanabe et al.
U.S. Appl. No. 10/549,574, filed Sep. 19, 2005, Kurimura et al.
U.S. Appl. No. 10/549,572, filed Sep. 19, 2005, Kurimura et al.

* cited by examiner

*Primary Examiner*—Randy Gulakowski
*Assistant Examiner*—Olga Asinovsky
(74) *Attorney, Agent, or Firm*—Oblon, Spivak, McClelland, Maier & Neustadt, P.C.

(57) ABSTRACT

To provide a block copolymer composition having a good balance in transparency and impact resistance, and particularly having an excellent impact resistance, by making a molded product of injection molding under high sear condition in such a manner as to hardly generate anisotropy. A block copolymer composed of a hard segment block comprising a block made mainly of a vinyl aromatic hydrocarbon and a soft segment block comprising a block made mainly of a conjugated diene, characterized by having a remarkably improved impact resistance without degrading transparency in respect of not only an extrusion-molded product and a blow-molded product but also an injection-molded product, by blending two kinds of block copolymers having a hard segment block of a specific structure.

14 Claims, 2 Drawing Sheets

BLOCK COPOLYMER COMPOSITION

TECHNICAL FIELD

The present invention relates to a block copolymer composition comprising a vinyl aromatic hydrocarbon and a conjugated diene, particularly to a block copolymer composition excellent in transparency and impact resistance and useful as a block copolymer composition as it is or useful for blending with various thermoplastic resins.

BACKGROUND ART

A block copolymer comprising a vinyl aromatic hydrocarbon and a conjugated diene, which has a relatively high vinyl aromatic hydrocarbon content, has been widely used for injection molding or extrusion molding of a sheet, a film or the like by utilizing properties such as transparency or impact resistance.

Particularly, some proposals have been made with regard to a block copolymer and a styrenic polymer composition having a block copolymer blended. The proposed examples include a branched block copolymer of two linear copolymers before coupling, which comprises vinyl-substituted aromatic hydrocarbon blocks of a high molecular weight content and a low molecular weight content at a number average molecular ratio of from 3 to 7, and its production method (as illustrated in JP-A-53-000286) and a branched block copolymer comprising polymer blocks of at least 3 monomer units of vinyl aromatic hydrocarbons and its production method (as illustrated in JP-A-07-173232).

Further, there have been proposed a linear copolymer composition having a vinyl aromatic hydrocarbon block portion molecular weight distribution of from 2.3 to 4.5 or a branched block copolymer composition having a vinyl aromatic hydrocarbon block portion molecular weight distribution of from 2.8 to 3.5 which is prepared by blending (as illustrated in JP-A-52-078260), or a method of combining branched block copolymers having a vinyl aromatic hydrocarbon block portion molecular weight distribution outside the range of from 2.8 to 3.5 (as illustrated in JP-A-57-028150).

However, according to these methods, these block copolymers and compositions prepared by blending these block copolymers with various thermoplastic resins had a poor balance in respect of transparency and impact resistance, and a molded product prepared by injection molding under high shearing condition tends to easily generate anisotropic properties and the molded product thus prepared was unsatisfactory because strength became weak in one respect.

DISCLOSURE OF THE INVENTION

Under these circumstances, the present inventors have variously studied to obtain a block copolymer composition excellent in balance between transparency and impact resistance with regard to not only an extrusion-molded product and a blow-molded product but also an injection-molded product, and have discovered that not only an extrusion-molded product and a blow-molded product but also an injection-molded product of a block copolymer prepared by coupling reaction, which comprises a hard segment block made mainly of a vinyl aromatic hydrocarbon and a soft segment block made mainly of a conjugated diene, provided a remarkably improved impact resistance without degrading transparency by blending two kinds of block copolymers having a specific structure of hard segment block portion. The present invention has been accomplished on the basis of this discovery.

Thus, the present invention relates to a block copolymer composition which is a block copolymer composition comprising, as monomer units, from 55 to 95 mass % of a vinyl aromatic hydrocarbon and from 5 to 45 mass % of a conjugated diene, characterized in that it contains the following components A and B in a blend ratio within a range of component A/component B=20 to 80/80 to 20 (mass ratio):

Component A is a block copolymer
(1) which comprises, as monomer units, from 55 to 95 mass % of a vinyl aromatic hydrocarbon and from 5 to 45 mass % of a conjugated diene,
(2) which is constituted by a hard segment block made mainly of the vinyl aromatic hydrocarbon and a soft segment block made mainly of the conjugated diene,
(3) wherein the hard segment block comprises blocks S1 and S2 made mainly of a vinyl aromatic hydrocarbon having two types of different molecular weights, and when the number average molecular weights of S1 and S2 are represented by M1 and M2, respectively, M1 is within a range of from 75,000 to 170,000 and M2 is within a range of from 14,000 to 30,000, and their ratio M1/M2 is within a range of from 4 to 9, and the ratio of S1 to S2 is within a range of S1/S2=6 to 35/65 to 94 (molar ratio), and
(4) which is produced by a coupling reaction; and
component B is a block copolymer
(1) which comprises, as monomer units, from 55 to 95 mass % of a vinyl aromatic hydrocarbon and from 5 to 45 mass % of a conjugated diene,
(2) which is constituted by a hard segment block made mainly of the vinyl aromatic hydrocarbon and a soft segment block made mainly of the conjugated diene,
(3) wherein the hard segment block comprises blocks S3 and S4 made mainly of a vinyl aromatic hydrocarbon having two types of different molecular weights, and when the number average molecular weights of S3 and S4 are represented by M3 and M4, respectively, M3 is within a range of from 80,000 to 160,000 and M4 is within a range of from 4,000 to 12,000 and their ratio M3/M4 is within a range of from 13 to 22, and the ratio of S3 to S4 is within a range of S3/S4=5 to 30/70 to 95 (molar ratio), and
(4) which is produced by a coupling reaction.

EFFECTS OF THE INVENTION

The block copolymer composition obtained in the present invention, which is a block copolymer as it is, or a resin composition prepared by blending the block copolymer with various thermoplastic resins, is applicable to extrusion molding, blow molding, injection molding, and other various molding processes, and can produce molded products having a quite satisfactory balance in respect of transparency and impact resistance.

The mechanism that the block copolymer composition of the present invention produces a molded product having such satisfactory transparency and impact resistance, is not clear, but it is estimated to be as described below. That is, the block copolymer composition of the present invention, in its primary molecular structure, has an average molecular weight, a molecular weight distribution and a composition distribution in such effective ranges as to achieve the above-mentioned properties, and its obtained molded product has a regular microphase separation structure and does not produce a macrolayer separation structure (when components in the composition form many macrophase separation structures of about at least 1 μm, visible light is dispersed and transparency is lowered), and a soft segment in the microphase separation structure thus formed has a relatively high continuation.

BEST MODE FOR CARRYING OUT THE INVENTION

Figure 1:
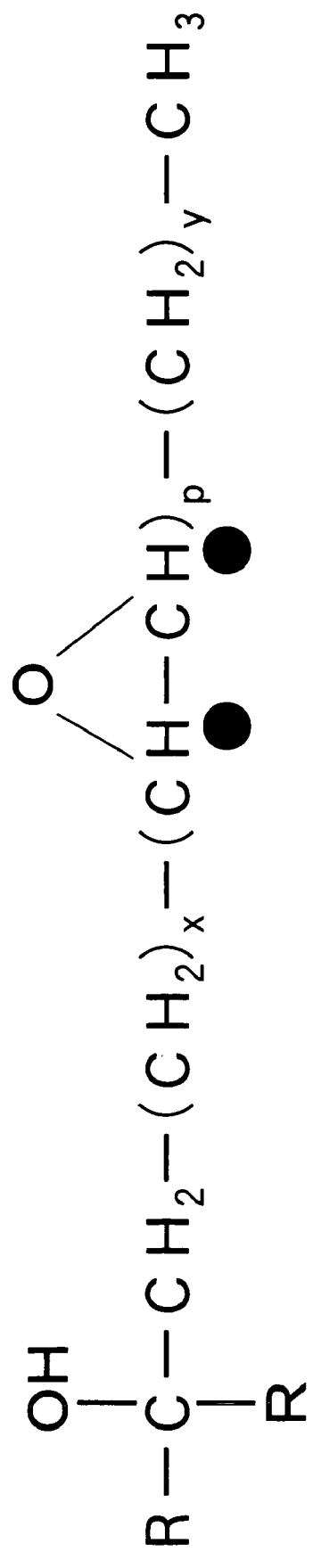
FIG. 1 illustrates a methine proton derived from an epoxy group present in an epoxidized oil residual group (proton having ● mark in FIG. 1).

Examples of a vinyl aromatic hydrocarbon used in the block copolymer composition of the present invention include styrene, o-methylstyrene, p-methylstyrene, p-tert-butylstyrene, 1,3-dimethylstyrene, α-methylstyrene, vinylnaphthalene, vinylanthracene or the like, and generally styrene. They may be used respectively alone or in a mixture of two or more.

Also, examples of a conjugated diene include a diolefin having one pair of conjugated double bonds and having a carbon number of from 4 to 8, such as 1,3-butadiene, 2-methyl-1,3-butadiene(isoprene), 2,3-dimethyl-1,3-butadiene, 1,3-pentadiene, 1,3-hexadiene or the like, and generally 1,3-butadiene or isoprene. They may be used respectively alone or in a mixture of two or more.

The block copolymer composition of the present invention comprises, as monomer units, from 55 to 95 mass % of a vinyl aromatic hydrocarbon and from 5 to 45 mass % of a conjugated diene, based on the total mass amount of the copolymer composition.

When the block copolymer composition comprises, as monomer units, more than 95 mass % of a vinyl aromatic hydrocarbon and less than 5 mass % of a conjugated diene, the impact resistance of the block copolymer composition becomes unpreferably low. On the other hand, when the block copolymer composition comprises, as monomer units, less than 55 mass % of a vinyl aromatic hydrocarbon and more than 45 mass % of a conjugated diene, the block copolymer composition provides unpreferable properties in respect of transparency, moldability, stiffness, thermostability and the like.

When the block copolymer composition comprises, as monomer units, from 60 to 85 mass % of a vinyl aromatic hydrocarbon and from 15 to 40 mass % of a conjugated diene, the block copolymer composition thus obtained provides more satisfactory balance in respect of impact resistance and transparency, and further when the block copolymer composition comprises, as monomer units, from 65 to 80 mass % of a vinyl aromatic hydrocarbon and from 20 to 35 mass % of a conjugated diene, the block copolymer composition thus obtained provides much more satisfactory good balance in respect of impact resistance, transparency, moldability and the like.

The block copolymer composition of the present invention contains components A and B in a blend ratio within a range of component A/component B=20 to 80/80 to 20 (mass ratio).

The component A is a block copolymer (1) which comprises, as monomer units, from 55 to 95 mass % of a vinyl aromatic hydrocarbon and from 5 to 45 mass % of a conjugated diene, (2) which is constituted by a hard segment block made mainly of the vinyl aromatic hydrocarbon and a soft segment block made mainly of the conjugated diene, (3) wherein the hard segment block comprises blocks S1 and S2 made mainly of a vinyl aromatic hydrocarbon having two types of different molecular weights, and when the number average molecular weights of S1 and S2 are represented by M1 and M2, respectively, M1 is within a range of from 75,000 to 170,000 and M2 is within a range of from 14,000 to 30,000, and their ratio of M1/M2 is within a range of from 4 to 9, and the ratio of S1 to S2 is within a S1/S2=6 to 35/65 to 94 (molar ratio), and (4) which is produced by a coupling reaction.

On the other hand, the component B is a block copolymer (1) which comprises, as monomer units, from 55 to 95 mass % of a vinyl aromatic hydrocarbon and from 5 to 45 mass % of a conjugated diene, (2) which is constituted by a hard segment block made mainly of the vinyl aromatic hydrocarbon and a soft segment block made mainly of the conjugated diene, (3) wherein the hard segment block comprises blocks S3 and S4 made mainly of a vinyl aromatic hydrocarbon having two types of different molecular weights, and when the number average molecular weights of S3 and S4 are represented by M3 and M4, respectively, M3 is within a range of from 80,000 to 160,000 and M4 is within a range of from 4,000 to 12,000 and their ratio M3/M4 is within a range of from 13 to 22, and the ratio of S3 to S4 is within a range of S3/S4=5 to 30/70 to 95 (molar ratio), and (4) which is produced by a coupling reaction.

When the component A comprises, as monomer units, more than 95 mass % of a vinyl aromatic hydrocarbon and less than 5 mass % of a conjugated diene, the impact resistance of the block copolymer composition finally obtained becomes unpreferably poor. On the other hand, when the component A comprises, as monomer units, less than 55 mass % of a vinyl aromatic hydrocarbon and more than 45 mass % of a conjugated diene, the block copolymer composition finally obtained provides unpreferably poor properties in respect of transparency, moldability, stiffness, thermostability and the like. On the contrary, when the component A comprises, as monomer units, from 60 to 90 mass % of a vinyl aromatic hydrocarbon and from 10 to 40 mass % of a conjugated diene, the block copolymer composition finally obtained provides a more satisfactory good balance in respect of impact resistance and transparency, and when the component A comprises, as monomer units, from 65 to 85 mass % of a vinyl aromatic hydrocarbon and from 15 to 35 mass % of a conjugated diene, the block copolymer composition finally obtained provides a much more satisfactory good balance in respect of impact resistance, transparency, moldability and the like.

Also, the component A is constituted by a hard segment block made mainly of the vinyl aromatic hydrocarbon and a soft segment block made mainly of the conjugated diene.

The hard segment block made mainly of the vinyl aromatic hydrocarbon means a block comprises, as monomer units, from 70 to 100 mass % of a vinyl aromatic hydrocarbon and from 0 to 30 mass % of a conjugated diene. When the block made mainly of the vinyl aromatic hydrocarbon is a block comprising, as monomer units, from 80 to 100 mass % of a vinyl aromatic hydrocarbon and from 0 to 20 mass % of a conjugated diene, the block copolymer composition finally obtained preferably has a satisfactory stiffness, and a block comprising, as monomer units, from 95 to 100 mass % of a vinyl aromatic hydrocarbon and from 0 to 5 mass % of a conjugated diene is more preferable, and a block comprising, as monomer units, a vinyl aromatic hydrocarbon is further preferable.

Also, when the block made mainly of a vinyl aromatic hydrocarbon is a copolymer block comprising, as monomer units, a vinyl aromatic hydrocarbon and a conjugated diene, the arrangement system of the monomer units may be a random structure or a taper structure, or also may be a block structure. Examples of the block structure includes a structure represented by V-D-V (the polymerization degree of V on the both sides of D may be the same or different) wherein D represents a conjugated diene block and V represents a vinyl aromatic hydrocarbon block.

Also, the soft segment block made mainly of a conjugated diene means a block comprising monomer units, from 60 to 100 mass % of a conjugated diene and from 0 to 40 mass % of a vinyl aromatic hydrocarbon. When the block made mainly of a conjugated diene is a block comprising, monomer units, from 70 to 100 mass % of a conjugated diene and from 0 to 30 mass % of a vinyl aromatic hydrocarbon, the block copolymer thus obtained has preferably a satisfactory impact resistance, and a block comprising a conjugated diene as monomer units is more preferable. When a copolymer block comprising a conjugated diene and a vinyl aromatic hydrocarbon is used as the soft segment block, the arrangement system of monomers may be any of a taper structure and a random structure, but a random structure is preferable.

Further, the hard segment block in component A comprises blocks S1 and S2 made mainly of a vinyl aromatic hydrocarbon having two types of different molecular weights, and when the number average molecular weight of S1 and S2 are represented by M1 and M2, respectively, M1 is within a range of from 75,000 to 170,000 and M2 is within a range of from 14,000 to 30,000, and their ratio M1/M2 is within a range of from 4 to 9, and the ratio of S1 to S2 is within a range of S1/S2=6 to 35/65 to 94 (molar ratio).

When the hard segment block in component A comprises blocks made mainly of a vinyl aromatic hydrocarbon having two types of different molecular weights, the finally obtained block copolymer composition provides a satisfactory molding processability and also provides a good balance in respect of transparency and impact resistance.

Also, when the blocks made mainly of two types of vinyl aromatic hydrocarbons are represented by S1 and S2, it is essential for the component A that the number average molecular weight M1 is within a range of from 75,000 to 170,000 and the number average molecular weight M2 is within a range of from 14,000 to 30,000. If the number average molecular weight M1 of S1 is less than 75,000, the finally obtainable block copolymer composition becomes poor in respect of impact resistance, and if it exceeds 170,000, the transparency of the finally obtained block copolymer composition is lowered.

If the number average molecular weight M2 of S2 is less than 14,000, the finally obtainable block copolymer composition becomes poor in respect of transparency and impact resistance, and if it exceeds 30,000, the impact resistance of the finally obtainable block copolymer composition is lowered. In view of good molding processability and well balanced transparency and impact resistance of the finally obtainable block copolymer composition, particularly preferable number average molecular weight ranges of S1 and S2 are respectively a range of from 100,000 to 150,000 and a range of from 15,000 to 18,000.

Further, the ratio M1/M2 of number average molecular weights M1 and M2 of component A is within a range of from 4 to 9. If the ratio M1/M2 is less than 4, the finally obtainable block copolymer composition becomes poor in respect of molding processability and impact resistance, and if the ratio M1/M2 exceeds 9, the transparency of the finally obtained block copolymer composition becomes poor. In view of good molding processability and well balanced transparency and impact resistance of the finally obtainable block copolymer composition, a particularly preferable range of the M1/M2 ratio is a range of from 5 to 8.

Also, in component A, the ratio of the two types of blocks is fixed in such a manner as to provide the ratio of S1 to S2 in a range of S1/S2=6 to 35/65 to 94 (molar ratio). In this manner, the finally obtainable block copolymer composition provides good molding processability and well balanced transparency and impact resistance. If the ratio of S1 is lower than the lower limit of the above range and the ratio of S2 is higher than the higher limit of the above range, the block copolymer becomes poor in respect of impact resistance and transparency, and if the ratio of S1 is higher than the higher limit of the above range and if the ratio of S2 is lower than the lower limit of the above range, the block copolymer provides poor processability and also provides poor impact resistance. In view of good molding processability and well balanced transparency and impact resistance of the block copolymer, a particularly preferable ratio of S1 and S2 is within a ratio of S1/S2=10 to 30/70 to 90 (molar ratio).

The molecular weight of component A is not particularly limited, but in view of molding processability of the block copolymer composition of the present invention, a preferable molecular weight range is from 60,000 to 160,000 as a number average molecular weight and from 90,000 to 220,000 as a weight average molecular weight. A more preferable range is from 80,000 to 140,000 as a number average molecular weight and from 120,000 to 200,000 as a weight average molecular weight. Also, the molecular weight distribution of component A is not specially limited, but in view of molding processability of the block copolymer composition of the present invention, a preferable molecular weight distribution (weight average molecular weight/number average molecular weight) range is from 1.2 to 1.8, more preferably from 1.3 to 1.6.

Also, component A is a block copolymer produced by a coupling reaction. Component A is produced by general living anion polymerization method using an organic lithium compound as an initiator in a hydrocarbon solvent. Monomers of a vinyl aromatic hydrocarbon and a conjugated diene are subjected to anion polymerization using an organic lithium compound as an initiator in a hydrocarbon solvent to form a living active terminal, and the living active terminal is then reacted with a coupling agent added to carry out coupling reaction for synthesis. Thus, the coupling reaction couples polymer chains having living active sites at one terminal and bond them. The coupling agent is a compound having at least two reactive sites per molecule capable of attacking living active sites and coupling and bonding polymer chains having living active sites at one side of terminals.

The coupling agent used in the present invention may be a difunctional coupling agent having two reactive sites per molecule or may be a polyfunctional coupling agent having at least three reactive sites per molecule. Only one kind of polyfunctional coupling agent may be used, or at least two kinds of polyfunctional coupling agents may be used, or further at least one kind of difunctional coupling agent and at least one kind of polyfunctional coupling agent may be used in combination. Preferably, only one kind of polyfunctional coupling agent is used.

When carrying out the coupling reaction, the reactive sites of the coupling agent attacked by living active sites are not necessarily completely reacted, but a part of the reactive sites may remain unreacted. Further, all of polymer chains having living active sites at one side of terminals are not always completely reacted with all of the reactive sites of the coupling agent, but unreacted polymer chains may remain in the block copolymer finally obtained.

Also, by using a polyfunctional coupling agent, a block copolymer having a branch number smaller than a branch number estimated to be completely reacted with the reactive sites of the coupling agent may coexist in the finally produced block copolymer, or a polymer chain having its living active sites simply replaced by a coupling agent or a polymer chain having one side terminal bonded with a coupling chain only may coexist in the finally produced block copolymer.

In such a case, component A obtained by using a difunctional coupling agent, includes a mixture of a block copolymer having the reactive sites of the coupling agent completely reacted, a polymer chain having a living active site replaced simply by the coupling agent and a polymer chain remained without reacting with the reactive site of the coupling agent. Also, component A obtained by using a polyfunctional coupling agent, includes a mixture of at least two of a block copolymer having a branch number equivalent to a branch number estimated to be completely reacted with the reactive sites of the coupling agent, a block copolymer having a branch number smaller than a branch number estimated to be completely reacted with the reactive sites of the coupling agent, a polymer chain having a living active site replaced and bonded simply by the coupling agent and a polymer chain remaining without reacting with the reactive sites of the coupling agent.

Examples of the coupling agent used in the present invention include a chlorosilane type compound such as silicon tetrachloride, 1,2-bis(methyldichlorosilyl)ethane or the like, an alkoxysilane type compound such as tetramethoxysilane, tetraphenoxysilane or the like, tin tetrachloride, a polyhalogenated hydrocarbon, a carboxylic acid ester, a polyvinyl compound, and an epoxidized oil such as epoxidized soybean oil, epoxidized linseed oil or the like.

Among these coupling agents, examples of a difunctional coupling agent having two reactive sites per molecule, include dimethyldichlorosilane, dimethyldimethoxysilane and the like. Examples of a polyfunctional coupling agent having at least 3 reactive sites per molecule include methyltrichlorosilane, methyltrimethoxysilane, tetrachlorosilane, tetramethoxysilane, tetraphenoxysilane and the like. Also, an epoxidized oil is a polyfunctional coupling agent since it has carbonyl carbons of 3 ester bonds per molecule and has a long chain alkyl group having at least one epoxy group.

A coupling agent preferably usable in the present invention is a polyfunctional coupling agent, and among them, an epoxidized oil is preferable. Examples of the epoxidized oil include epoxidized soybean oil, epoxidized linseed oil or the like, and among them, epoxidized soybean oil is particularly preferable.

Such an epoxidized oil as epoxidized soybean oil or epoxidized linseed oil is a compound of an epoxidized glycerin ester of a mixture of long chain carboxylic acids including an unsaturated acid such as oleic acid, linolic acid, linolenic acid or the like. When these compounds are used as a polyfunctional coupling agent, branch numbers of block copolymers obtained are respectively 5, 3 and 4, corresponding to their structures of one linolenic acid residue having three epoxy groups and one carbonyl group, one oleic acid residue having one epoxy group and one carbonyl group, and one linolic acid residue having two epoxy groups and one carbonyl group. Thus, when all of their reactive sites are completely reacted, block copolymer compositions having branch numbers respectively of 3 to 5 are obtained, and the maximum branch number among them is 5.

Also, component B is the same as component A in respect that it is a block copolymer (1) which comprises, as monomer units, from 55 to 95 mass % of a vinyl aromatic hydrocarbon and from 5 to 45 mass % of a conjugated diene, (2) which is constituted by a hard segment block made mainly of the vinyl aromatic hydrocarbon and a soft segment block made mainly of the conjugated diene, and (4) which is produced by a coupling reaction, and such requirements as defined with regard to component A are applicable also to component B.

However, component B is different from component A in respect of (3) wherein the hard segment block comprises blocks S3 and S4 made mainly of two kinds of vinyl aromatic hydrocarbons having different molecular weights, and when the number average molecular weight of S3 and S4 are represented by M3 and M4, respectively, M3 is within a range of from 80,000 to 160,000 and M4 is within a range of from 4,000 to 12,000 and their ratio M3/M4 is within a range of from 13 to 22, and the ratio of S3 to S4 is within a range of S3/S4=5 to 30/70 to 95 (molar ratio). This different point is described hereinafter.

The hard segment block of component B is a block made mainly of a vinyl aromatic hydrocarbon having two types of different molecular weights. Accordingly, the finally obtainable block copolymer composition provides good molding processability and well balanced transparency and impact resistance, and this point is the same as component A.

However, in component B, it is essential that blocks S3 and S4 made mainly of two types of vinyl aromatic hydrocarbons respectively have number average molecular weights M3 and M4 respectively of a range of from 80,000 to 160,000 and a range of from 4,000 to 12,000. If the number average molecular weight M3 of S3 is less than 80,000, the finally obtainable block copolymer composition is poor in respect of impact resistance, and if it exceeds 160,000, the finally obtainable block copolymer composition is poor in respect of not only impact resistance but also transparency. If the number average molecular weight M4 of S4 is less than 4,000, the finally obtainable block copolymer composition becomes poor in respect of transparency and also poor in respect of molding processability because its fluidity becomes too high. On the other hand, if it exceeds 12,000, the finally obtainable block copolymer composition provides a lower impact resistance. In view of well balanced good molding processability, transparency and impact resistance of the finally obtainable block copolymer composition, M3 is preferably from 90,000 to 140,000, and M4 is preferably from 4,000 to 12,000, more preferably from 5,000 to 9,000.

Further, in component B, it is essential that the number average molecular weights M3 and M4 should have a ratio of M3/M4 in a range of from 13 to 22. If the ratio M3/M4 is less than 13, the finally obtainable block copolymer composition becomes poor in respect of impact resistance, and if the ratio M3/M4 exceeds 22, the finally obtainable block copolymer composition becomes poor in respect of transparency. In view of well balanced good molding processability, transparency and impact resistance of the finally obtained block copolymer composition, a particularly preferable M1/M2 ratio is in a range of from 14 to 19.

Also, in component B, a ratio of two types of blocks S3 and S4 is fixed in such a manner as to provide a range of S3/S4=5 to 30/70 to 95 (molar ratio). In this manner, the finally obtained block copolymer composition provides well balanced good molding processability, transparency and impact resistance. If the proportion of S3 is lower than the lower limit of the above range and if the proportion of S4 is higher than the upper limit of the above range, the block copolymer composition becomes poor in respect of impact resistance and transparency, and if the proportion of S3 exceeds the upper limit of the above range and the proportion of S4 is lower than the lower limit of the above range, the block copolymer composition becomes poor also in respect of impact resistance, and molding processability becomes low. In view of well balanced good molding processability, transparency and impact resistance of the block copolymer, a particularly preferable ratio of S3 and S4 is S3/S4=10 to 25/75 to 90 (molar ratio).

Also, the molecular weight of component B is not specially limited, but in view of molding processability of the block copolymer composition of the present invention, a preferable molecular weight range is from 60,000 to 110,000 as a number average molecular weight and from 100,000 to 180,000 as a weight average molecular weight. A more preferable range is from 80,000 to 90,000 as a number average molecular weight and from 120,000 to 150,000 as a weight average molecular weight. Also, the molecular weight distribution of component B is not particularly limited, but in view of molding processability of the block copolymer composition of the present invention, a preferable molecular weight distribution range is from 1.3 to 2.0, more preferably from 1.4 to 1.8.

The block copolymer composition of the present invention contains these components A and B in a mixing ratio of component A/component B=20 to 80/80 to 20 (mass ratio). When the mixing ratio is within this range, a block copolymer composition having well balanced good molding processability, impact resistance and transparency is obtainable.

If the mixing proportion of component A is less than 20 and the mixing proportion of component B exceeds 80, the finally obtainable block copolymer composition becomes poor in respect of molding processability because its fluidity becomes too high, and also becomes poor in respect of transparency. On the other hand, if the mixing proportion of component A exceeds 80 and the mixing proportion of component B is less than 20, the finally obtainable block copolymer composition becomes poor in respect of molding processability because its fluidity is lowered, and also becomes poor in respect of impact strength.

Particularly, a block copolymer comprising component A alone provides a remarkably low fluidity and a very poor impact strength, and a block copolymer comprising component B alone provides a remarkably high fluidity and a very poor transparency, but such a block copolymer composition comprising a mixture of component A and component B as in the present invention provides well balanced good molding processability, impact resistance and transparency.

Further, a more preferable mixing ratio is component A/component B=30 to 70/70 to 30 (mass ratio).

A molecular weight of a block copolymer composition containing component A and component B of the present invention is not specially limited, but in view of molding processability of the block copolymer composition, a preferable molecular weight range is from 60,000 to 140,000 as a number average molecular weight and from 110,000 to 200,000 as a weight average molecular weight. A more preferable range is from 80,000 to 110,000 as a number average molecular weight and from 120,000 to 180,000 as a weight average molecular weight. Also, a molecular weight distribution of the block copolymer composition is not specially limited, but in view of molding processability of the block copolymer composition, a preferable molecular weight distribution range is from 1.4 to 2.0, more preferably from 1.4 to 1.8.

As mentioned above, component A and component B in the present invention are obtainable by general living anion polymerization method using an organic lithium compound as an initiator in a hydrocarbon solvent. Thus, monomers of a vinyl aromatic hydrocarbon and a conjugated diene are subjected to anion polymerization using an organic lithium compound as an initiator in a hydrocarbon solvent to form living active terminals, and the living active terminals are then reacted with a coupling agent added by coupling method. For example, when producing component A and component B comprising a block of monomers of a vinyl aromatic hydrocarbon as a hard segment block and a block of monomers of a conjugated diene as a soft segment block, a vinyl aromatic hydrocarbon is anion-polymerized in the presence of an initiator, and then the initiator and a vinyl aromatic hydrocarbon are successively added to the polymerization system to form a polymer block comprising monomer units of two types of vinyl aromatic hydrocarbons having different molecular weights, and a conjugated diene is then added thereto, finally followed by coupling step.

Examples of the organic solvent used for producing component A and component B include an aliphatic hydrocarbon such as butane, pentane, hexane, isopentane, heptane, octane, isooctane or the like, a cycloaliphatic hydrocarbon such as cyclopentane, methylcyclopentane, cyclohexane, methylcyclohexane, ethylcyclohexane or the like, an aromatic hydrocarbon such as benzene, toluene, ethyl benzene, xylene or the like, and other well known organic solvents.

Also, the organic lithium compound is a compound having at least one lithium atom bonded in a molecule, such as ethyl lithium, n-propyl lithium, isopropyl lithium, n-butyl lithium, sec-butyl lithium, t-butyl lithium or the like.

In the production of component A and component B of the present invention, a small amount of a polar compound may be dissolved in a solvent. The polar compound is used for improving efficiency of an initiator or for adjusting microcomposition of a conjugated diene, or used as a randomizing agent when copolymerizing a vinyl aromatic hydrocarbon and a conjugated diene. Examples of the polar compound used for producing component A and component B of the present invention include ethers such as tetrahydrofuran, diethylene glycol dimethyl ether, diethylene glycol dibutyl ether or the like, amines such as triethylamine, tetramethylethylenediamine or the like, thioethers, phosphines, phosphoramides, alkylbenzene sulfonates, alkoxides of potassium or sodium, and the like, and a preferable polar compound is tetrahydrofuran.

Polymerization temperature for preparing component A and component B in the present invention is generally from $-10°$ C. to $150°$ C., preferably from $40°$ C. to $120°$ C. Polymerization time varies depending on conditions, but is generally within 48 hours, particularly preferably from 0.5 to 10 hours. Also, atmosphere for polymerization system is preferably replaced by an inert gas such as nitrogen gas. Polymerization pressure is not specially limited, but may be such a pressure as to be sufficient for maintaining monomers and solvents at a liquid phase in the above polymerization temperature range. Further, it is necessary to pay such attention that the polymerization system is not contaminated with impurities such as water, oxygen or carbonic acid gas which may deactivate an initiator and a living polymer.

After finishing polymerization and coupling reactions, an active block copolymer which does not participate in the coupling reaction, is deactivated by adding a material having active hydrogen such as water, alcohol, carbon dioxide, an organic acid or an inorganic acid as a polymerization terminator in an amount sufficient to deactivate active terminals. At this time, when using water or alcohols as a polymerization terminator, hydrogen is introduced into polymerization chain terminals, and when using carbon dioxide, a carboxyl group is introduced into polymerization chain terminals. Accordingly, by appropriately selecting a polymerization terminator, it is possible to produce a block copolymer containing a block copolymer component having various functional groups at the terminals.

An amount of a coupling agent may be an optional effective amount, but is preferably adjusted to such an amount as to make the reactive sites of the coupling agent stoichiometrically excessively present to the living active terminals. For example, it is preferable to add the coupling agent in such an amount as to make the reactive sites present in an amount of 1 to 2 equivalents to mol number of living active terminals present in a polymerization solution before coupling step. In this manner, a mol number of lithium atom present in the reaction system can be calculated from a charged amount of an organic lithium compound, for example, as an initiator, and accordingly by considering this mol number as a mol number of the living active terminals, an amount of the coupling agent to be added in such an amount as to make a desired equivalent number of reactive sites present in the reaction system, can be determined. This equivalent amount is expressed by defining a reactive site number of a coupling agent added to the reaction system as a multiple number of living active terminal number.

In a case that the block copolymer composition of the present invention is a block copolymer composition containing component A and component B prepared by coupling using an epoxidized oil, when a proportion of a mol number of ring-opened epoxy group residues present in the epoxidized oil residues in the block copolymer composition is less than 0.7 to a total mol number of the ring-opened epoxy residues and epoxy groups present in the epoxidized oil residues, a mixture resin composition of the block copolymer composition and a styrene type resin is improved in respect of impact resistance and provides a preferable good balance of transparency, molding processability and other physical properties. The proportion of the above mol number is more preferably from 0.03 to 0.65, most preferably from 0.03 to 0.5, particularly, when this proportion is within a range of from 0.1 to 0.3, the block copolymer composition provides an improved impact resistance, particularly such an impact resistance in the presence of a notch as represented by Charpy impact strength. This proportion can be controlled by an amount of a coupling agent to be added in the coupling step, and the amount of the coupling agent is adjusted in such an amount as to make the reactive sites present preferably in an amount of 1 to 2 equivalents, more preferably from 1 to 1.5 equivalents, in the reaction system.

The proportion to the above mol number can be determined by proton NMR spectrum measurement of the block copolymer composition of the present invention by using a deuterium substituted solvent such as deuterium substituted chloroform, deuterium substituted tetrahydrofuran or the like or carbon tetrachloride.

In order to adjust the proportion of mol number of ring-opened epoxy group residues present in an epoxidized oil residue in the block copolymer composition of the present invention less than 0.7 to the total mol number of the ring-opened epoxy group residues and epoxy groups present in the epoxidized oil residue, it is preferable for achieving a good balance of impact resistance, transparency, molding processability and other physical properties of a mixture resin composition of the block copolymer composition and a styrenic resin to control the proportion of mol number of each of component A and component B of the block copolymer composition respectively less than 0.7 to the total mol number of the ring-opened epoxy group residues and epoxy groups present in the epoxidized residue.

Hereinafter, a particularly preferable structure of each of component A and component B constituting the block copolymer composition of the present invention is illustrated below. Component A is a block copolymer having a block made mainly of a vinyl aromatic hydrocarbon having two types of different molecular weights produced by coupling reaction, examples of which include a mixture of three types of block copolymers as defined in the following (1).

$$S1-B1, S2-B1, (S1-B1)i-X-(B1-S2)m \tag{1}$$

(wherein each of S1 and S2 represents a hard segment block made mainly of a vinyl aromatic hydrocarbon, B1 represents a soft segment block made mainly of a conjugated diene, the number average molecular weight of B1 is within a range of from 10,000 to 30,000, X is a residual group of a coupling agent, each of i and m is an integer of 0 or more, and i+m is at least 1 and at most 8.)

In component A, the molecular weight of block B1 made mainly of a conjugated diene as a soft segment block is preferably in a range of from 10,000 to 30,000 as a number average molecular weight. If the molecular weight is within this range, a block copolymer having a good balance in transparency, impact resistance and molding processability can be obtained. If the soft segment block B1 has a number average molecular weight of less than 10,000, the block copolymer becomes poor in respect of impact resistance, and if the number average molecular weight exceeds 30,000, the block copolymer becomes poor in respect of transparency and molding processability. In order to obtain a block copolymer having a good balance in transparency, impact resistance and molding processability, the number average molecular weight of the soft segment block is particularly preferably in a range of from 11,000 to 26,000. Also, if i+m is at least 1 and at least 8, a block copolymer having satisfactory transparency, impact resistance and molding processability can be obtained, and i+m is more preferably at least 1 and at most 5.

It is preferable that component A contains a branched block copolymer in an amount of from 65 to 90 mass %. The branched block copolymer is a component that a remaining polymer chain which does not participate in coupling reaction and a polymer chain having a living active site simply replaced and bonded with a coupling chain, are removed from the block copolymer mixture as defined in (1).

The content of the branched block copolymer in component A can be determined by gel permeation chromatogram in the following manner.

That is, in the gel permeation chromatogram of component A, a peak area of a branched block copolymer in component A is determined by calculating a sum of peak areas corresponding to linear block copolymers S1-B1 and S2-B1 before coupling (this is a sum of peak areas of a remaining polymer chain which does not participate in coupling reaction and a polymer chain having a living active site simply replaced and bonded with a coupling agent) and deducting this value from a total peak area value.

By expressing the above determined peak area of a branched block copolymer to the total peak area by percentage, the branched block copolymer content in component A can be determined as mass %.

A particularly preferable branched block copolymer content is in a range of from 70 to 85 mass %. If the branched block copolymer content in component A is less than 65 mass %, a mixture resin composition of the block copolymer and a styrenic resin becomes poor in respect of impact resistance, transparency and molding processability, and if the content exceeds 90 mass %, a mixture resin composition of the block copolymer and a styrenic resin provides a poor impact resistance.

Next, component B contains a block copolymer having a block made mainly of a vinyl aromatic hydrocarbon having two types of different molecular weights produced by coupling reaction, examples of which include a mixture of three types of block copolymers as defined in the following (2).

$$S3-B2, S4-B2, (S3-B2)n-Y-(B2-S4)o \quad (2)$$

(wherein each of S3 and S4 is a hard segment block made mainly of a vinyl aromatic hydrocarbon, B2 represents a soft segment block made mainly of a conjugated diene, the number average molecular weight of B2 is within a range of from 9,000 to 20,000, Y is a residual group of a coupling agent, each of n and o is an integer of 0 or more, and n+o is at least 1 and at most 8.)

In component B, the molecular weight of the block B2 made mainly of a conjugated diene as a soft segment block is preferably in a range of 9,000 to 20,000 as a number average molecular weight. If the molecular weight is within this range, it is possible to obtain a block copolymer having a good balance in transparency, impact resistance and molding processability. If the number average molecular weight of the soft segment block B2 is less than 9,000, the block copolymer provides a poor impact resistance, and if the molecular weight exceeds 20,000, transparency and molding property become poor. In order to obtain a block copolymer having a good balance in transparency, impact resistance and molding processability, a particularly preferable number average molecular weight range of the soft segment block is from 12,000 to 16,000. Also, if n+o is at least 1 and at most 8, a block copolymer having satisfactory transparency, impact resistance and molding processability can be obtained, and n+o is more preferably at least 1 and at most 5.

It is preferable that component B contains a branched block copolymer in an amount of from 65 to 90 mass %. The branched block copolymer is a component that a remaining polymer chain which does not participate in coupling reaction and a polymer chain having a living active site simply replaced and bonded with a coupling agent are removed from a block copolymer mixture as defined in (2). The content of the branched block copolymer in component B can be determined by gel permeation chromatogram in the same manner as in component A. A particularly preferable branched block copolymer content in component B is within a range of from 70 to 85 mass %. If the branched block copolymer content in component B is less than 65 mass %, a mixed resin composition of the block copolymer and a styrenic resin becomes poor in respect of impact resistance, transparency and molding processability, and if the branched block copolymer content exceeds 90 mass %, a mixed resin composition of the block copolymer and a styrenic resin becomes poor in respect of impact resistance.

The block copolymer composition of the present invention is obtained by mixing component A and component B. A mixing method is not specially limited, and a deactivated solution after polymerizing component A and component B, may be mixed, or a mixture of pellets of component A and component B may be melt-kneaded by an extruder.

If necessary, the block copolymer composition of the present invention may be blended with various additives. For example, additives such as a stabilizer, a lubricant, a processing aid, an anti-blocking agent, an antistatic agent, an anti-clouding agent, a weather resistance-improving agent, a softening agent, a plasticizer, a pigment and the like may be blended in order to prevent physical properties from being degraded when the block copolymer is subjected to various heat treatments or when its molded product is used in an oxidizing atmosphere or under irradiation with ultraviolet rays, or in order to further impart physical properties suitable for a use object.

Examples of the stabilizer include a phenol type antioxidant such as 2-[1-(2-hydroxy-3,5-di-tert-pentylphenyl) ethyl]-4,6-di-tert-pentylphenylacrylate, 2-tert-butyl-6-(3-tert-butyl-2-hydroxy-5-methylbenzyl)-4-methylphenylacrylate, octadecyl-3-(3,5-di-tert-butyl-4-hydroxyphenyl)propionate, 2,6-di-tert-butyl-4-methylphenol or the like, and a phosphorus type antioxidant such as 2,2-methylenebis(4,6-di-tert-butylphenyl)octylphosphite, trisnonylphenylphosphite, bis(2,6-di-tert-butyl-4-methylphenyl)pentaerythritol-diphosphite or the like.

Also, examples of the lubricant, processing aid, anti-blocking agent, antistatic agent or anti-clouding agent include a saturated aliphatic acid such as palmitic acid, stearic acid, behenic acid or the like, an aliphatic acid ester such as octyl palmitate, octyl stearate or the like, a pentaerythritol aliphatic acid ester, an aliphatic acid amide such as erucic amide, oleic amide, stearic amide or the like, ethylenebis stearic amide, or glycerin-mono-aliphatic acid ester, glycerin-di-aliphatic acid ester, a sorbitan aliphatic acid ester such as sorbitan-mono-palmitic acid ester, sorbitan-mono-stearic acid ester or the like, a higher alcohol such as myristyl alcohol, cetyl alcohol, stearyl alcohol, or the like.

Examples of the weather resistance-improving agent include a benzotriazole type agent such as 2-(2'-hydroxy-3'-tert-butyl-5'-methylphenyl)-5-chlorobenzotriazole or the like, a salicylate type agent such as 2,4-di-tert-butylphenyl-3',5'-di-tert-butyl-4'-hydroxybenzoate or the like, a benzophenone type UV ray absorber such as 2-hydroxy-4-n-octoxybenzophenone or the like, or a hindered amine type weather resistance-improving agent such as tetrakis(2,2,6,6-tetramethyl-4-piperidyl)-1,2,3,4-butanetetracarboxylate or the like. Further, white oil, silicone oil or the like may be added.

These additives are blended with the block copolymer composition of the present invention preferably in an amount of from 0 to 5 mass %.

The block copolymer composition thus obtained in the present invention can be easily molded into various practically useful products including sheets, foams, films, and other variously shaped injection molded products, blow molded products, pressure blow molded products, vacuum molded products, biaxially oriented molded products, and the like by employing conventional well known optional molding methods such as extrusion molding, injection molding, blow molding or the like.

If necessary, the block copolymer composition of the present invention may be blended with various thermoplastic resins to form resin compositions.

Examples of usable thermoplastic resins include a polystyrene type polymer, a polyphenylene ether type polymer, a polyethylene type polymer, a polypropylene type polymer, a polybutene type polymer, a polyvinyl chloride type polymer, a polyvinyl acetate type polymer, a polyamide type polymer, a thermoplastic polyester type polymer, a polyacrylate type polymer, a polyphenoxy type polymer, a polyphenylene sulfide type polymer, a polycarbonate type polymer, a polyacetal type polymer, a polybutadiene type polymer, a thermoplastic polyurethane type polymer, a polysulfine type polymer and the like, but a preferable thermoplastic resin is a styrene type polymer, and among them, polystyrene resin, styrene-butyl acrylate copolymer and styrene-methyl methacrylate copolymer are particularly preferably usable.

A blending mass ratio of the block copolymer composition of the present invention and a thermoplastic resin is preferably block copolymer composition/thermoplastic resin=3/97 to 90/10. If the blending amount of the block copolymer composition is less than 3 mass %, impact resistance of the resin composition thus formed is not fully improved, and if the blending amount of the thermoplastic resin is less than 10 mass %, stiffness expected to be improved by being blended with the thermoplastic resin is not sufficient. A particularly preferable blending mass ratio of the block copolymer composition and the thermoplastic resin is block copolymer composition/thermoplastic resin=30/70 to 80/20, more preferably block copolymer composition/thermoplastic resin=40/60 to 70/30.

Hereinafter, the present invention is illustrated with reference to Examples. However, the present invention is not limited to these Examples. The data shown in the Examples and Comparative Examples were measured in accordance with the following method.

Total light transmittance and cloud value were measured in accordance with JIS-K7105, and Charpy impact strength was measured in accordance with JIS K-7111 (having notch) by preparing a test piece molded from resin pellets by injection molding machine.

Dropping weight impact strength was measured by forming a flat plate having a thickness of 2 mm by injection molding machine, naturally dropping a weight of 6.5 kg from a height of 62 cm onto the flat face of the flat plate test piece fixed by a holder (diameter 40 mm) by using dropping weight graphic impact tester (trademark of instrumented dropping weight impact tester of Toyo Seiki Seisaku-Sho, Ltd.), having the test piece completely destroyed or penetrated by a striker (diameter 12.7 mm) fixed at the lower part of the weight, and measuring total energy (referred to as total absorption energy) required at this time.

Polybutadiene rubber component amount (PBd amount) in a block copolymer composition was determined by halogen addition method adding iodine chloride into a double bond.

Flow properties (MFR) under a high temperature was measured in accordance with JIS-K7210.

Measuring conditions of gel permeation chromatography (GPC) are illustrated in the following measuring condition 1 and measuring condition 2.

Measuring Condition 1
  Solvent (mobile phase): THF
  Flow rate: 1.0 ml/min
  Temperature: 40° C.
  Column structure: Three columns in total (theoretical step number 32,000 steps in total) composed of one column of TSK guard column MP (xL) 6.0 mmID×4.0 cm manufactured by Tosoh Corporation and two columns of TSK-GEL MULTIPORE HXL-M, 7.8 mmID×30.0 cm (theoretical step number 16,000 steps) manufactured by Tosoh Corporation arranged in this order
  Amount of sample charged: 100 µL (sample solution concentration 1 mg/ml)
  Pressure of charging solution: 39 kg/cm$^2$
  Detector: RI detector Measuring Condition 2
  Solvent (mobile phase): THF
  Flow rate: 0.2 ml/min
  Temperature: 40° C.
  Column structure: Five columns in total (theoretical step number 100,000 steps in total) of one column of KF-G 4.6 mmID×10 cm manufactured by Showa Denko K.K. and four columns of KF-404HQ, 4.6 mmID×250 cm manufactured by Showa Denko K.K. (theoretical step number 25,000 steps) arranged in this order
  Amount of sample charged: 10 µL (sample solution concentration 2 mg/ml)
  Pressure of charging solution: 127 kg/cm$^2$
  Detector: RI detector Number average molecular weight of a soft segment block made mainly of a conjugated diene was measured in the following manner. In the case of component A, when number average molecular weight values of respective peaks corresponding to GPC chromatogram under measuring condition 1 of a mixture of S1 and S2 are represented respectively by M1 and M2 and number average molecular weight values of respective peaks corresponding to GPC chromatogram under measuring condition 2 of a mixture of S1-B1 and S2-B1 are represented respectively by M5 and M6, value X obtained by the following formula is defined as a polystyrene conversion value of a number average molecular weight of a soft segment block.

$$X=\{(M5-M1)+(M6-M2)\}/2$$

Thereafter, a standard polybutadiene having a known molecular weight was subjected to GPC measurement to determine a polystyrene conversion molecular weight of the standard polybutadiene, and from the polystyrene conversion molecular weight value X, a number average molecular weight of a soft segment block comprising a homopolymer of conjugated diene was calculated by employing conversion formula Y=0.58×X to be converted to absolute molecular weight value Y.

In the case of component B also, when number average molecular weight values of respective peaks corresponding to GPC chromatogram under measuring condition 1 of a mixture of S3 and S4 are represented respectively by M3 and M4 and number average molecular weight values of respective peaks corresponding to GPC chromatogram under measuring condition 2 of a mixture of S3-B2 and S4-B2 are represented respectively by M7 and M8, value X obtained by the following formula is defined as a polystyrene conversion value of a number average molecular weight of a soft segment block.

$$X=\{(M7-M3)+(M8-M4)\}/2$$

Thereafter, a number average molecular weight of a soft segment block was calculated in the same manner as in Component A.

Each content of a branched block copolymer contained in component A and component B was determined by gel permeation chromatogram in the following manner.

In the-case of component A, with regard to peaks corresponding to linear block copolymers S1-B1 and S2-B1 before coupling, peak top molecular weights M5 and M6 of components corresponding to S1-B1 and S2-B1 obtained from gel permeation chromatogram of sampling products after finishing third stage butadiene polymerization, were measured.

Thereafter, by selecting peaks of respective molecular weights M5 and M6 on gel permeation chromatogram of the component A finally obtained, peaks corresponding to S1-B1 and S2-B1 were determined.

Area of peaks of components corresponding to S1-B1 and S2-B1 thus determined, was calculated as an area of peak of a part enclosed by a base line and a perpendicular line drawn to the base line from a valley between adjacent peaks.

A peak area of a branched block copolymer in component A was determined by calculating a sum of peak areas of these two components and deducting this value from the total chromatogram area value of component A. An area ratio by percentage of the peak area of branched block copolymer thus obtained to the total chromatogram area of component A was determined to be a branched block copolymer content in component A as mass %.

In the same manner as in component A, a branched block copolymer content in component B was determined by mass %.

A molar ratio of S1 and S2 in component A was determined in the following manner. In GPC chromatogram under measuring condition 1 of a mixture of S1 and S2, when peak top molecular weight values of respective peaks corresponding to components S1 and S2 are represented respectively by Mp1 and Mp2 and area ratios of respective peaks are represented respectively by A1 and A2, the molar ratio of S1 and S2 was calculated in accordance with the following formula.

$$S1:S2 \text{ (molar ratio)}=(A1/Mp1):(A2/Mp2)$$

Also, in the same manner as in component A, a molar ratio of S3 and S4 in component B was determined.

A ratio of mol number of an opened epoxy group residue present in an epoxidized oil residue to a total mol number of the opened epoxy group residue and an epoxy group present in the epoxidized oil residue in a block copolymer composition was determined in the following manner.

40 mg of a sample was dissolved in 1 ml of deuterium substituted chloroform, and proton NMR spectrum was measured by using JNM-α500FT-NMR manufactured by JEOL Ltd. under the following conditions.

Figure 2:
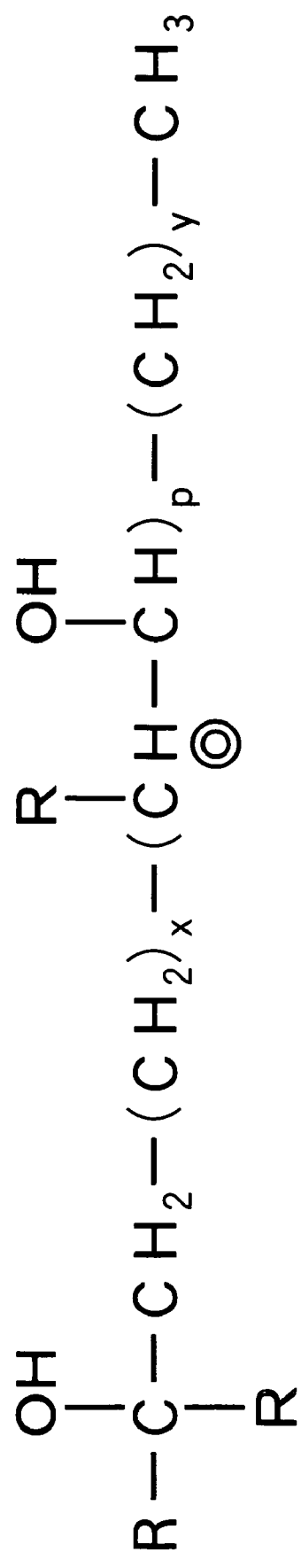
FIG. 2 illustrates a methine proton derived from a ring opened epoxy group residue present in an epoxidized oil residual group (proton having ◎ mark in FIG. 2).

Pulse width=5.90 μs (45°), data point=16384, repeating time=7.0480 seconds, AD converter=32 K bits, accumulated times=792, sample tube=5 mmΦ, and measuring temperature=room temperature In the proton NMR spectrum thus obtained, a peak of methine proton (proton with ● mark in FIG. 1) derived from an epoxy group present in an epoxidized oil residue appears at 2.8 to 3.2 ppm. On the other hand, a peak of methine proton with ◎ mark in FIG. 2) derived from an opened epoxy group residue present in the epoxidized oil residue appears at 3.75 ppm.

By employing a chemical shift peak (area M) at 2.8 to 3.2 ppm and a chemical shift peak (area N) at 3.75 ppm, a ratio R of an opened epoxy group residue present in an epoxidized residue to a total mol number of the opened epoxy group residue and an epoxy group present in the epoxidized oil residue in the block copolymer composition was calculated in accordance with the following formula.

$$R=(2 \times N)/(M+2 \times N)$$

Also, with regard to component A and component B, a ratio of a mol number of a ring-opened epoxy group residue present in an epoxidized oil residue to a total mol number of the ring-opened epoxy group residue and an epoxy group present in the epoxidized oil residue was determined by measuring proton NMR spectrum in the same manner as in the case of block copolymer composition.

EXAMPLE 1

First, component A was prepared in the following manner.

A stainless-made polymerization tank equipped with a jacket·stirrer and having an internal volume of 3 L was washed with cyclohexane and substituted with nitrogen, and then 1,233 g of cyclohexane dehydrated to a water content of at most 6 ppm and containing 150 ppm of tetrahydrofuran was charged into the polymerization tank, and 129 g of styrene dehydrated to a water content of at most 5 ppm was then added thereto. After raising an internal temperature to 50° C., 1.5 ml of a cyclohexane solution (mol concentration 1.2 mol/l) containing 10 mass % of n-butyl lithium was added thereto, and polymerization was effected for 20 minutes at such a temperature that the maximum temperature does not exceed 120° C. (first stage polymerization).

Thereafter, under such a constant condition of an internal temperature of 50° C., 7.8 ml of a cyclohexane solution containing 10 mass % of n-butyl lithium and then 171 g of styrene dehydrated to a water content of at most 5 ppm were added and polymerized for 20 minutes at such a temperature that the maximum temperature does not exceed 120° C. (second stage polymerization).

After finishing the second stage polymerization, sampling was made and a sampled polymerization solution was diluted with toluene, and the solution thus diluted was poured into a large amount of methanol to precipitate a polymer content which was then vacuum-dried to obtain a solid content. The solid content thus obtained was subjected to GPC measurement under measuring condition 1, and it was observed that two kinds of polystyrene chains were present in the sampled material, and when a material having a higher number average molecular weight is represented by M1 and a material having a lower number average molecular weight is represented by M2, the results were M1=95300 and M2=15700.

Further, after raising the internal temperature to 80° C., 111 g of butadiene dehydrated by passing through a molecular sieve was added, and the resultant material was polymerized for 20 minutes at such a temperature that the maximum temperature does not exceed 120° C. (third stage polymerization).

After finishing the third stage polymerization, sampling was made, and the sampled polymerization solution was diluted with toluene, and the solution thus diluted was poured into a large amount of methanol to precipitate a polymer content which was then vacuum-dried to obtain a solid content. The solid content was then subjected to GPC measurement under measuring condition 2, and it was observed that two kinds of polymer chains (styrene-butadiene diblock copolymers having respectively different molecular weights) were present in the sampled polymerization solution, and when a material having a higher number average molecular weight (polystyrene conversion value) is represented by M5 and a material having a lower number average molecular weight is represented by M6, the respective number average molecular weights were M5=119500 and M6=36300.

After finishing the successive polymerization, a solution having 1.4 g (corresponding to 1.3 equivalent) of epoxidized soybean oil "Vikoflex 7170" (ATOFINA CHEMICALS CO.) dissolved in 10 ml of cyclohexane was added to the reaction solution under a constant condition of an internal temperature of 80° C. to carry out coupling reaction for 30 minutes (coupling step).

The amount of epoxidized soybean oil "Vikoflex 7170" added was determined in the following manner.

Since Vikoflex 7170 has a molecular weight of 1,000 and an oxirane oxygen content of 7.1%, Vikoflex 7170 has 4.4 mols of epoxy groups per mol. On the other hand, since Vikoflex 7170 has 3 mols of carbonyl groups per mol, Vikoflex 7170 has 10.4 mols of coupling reaction sites per mol. Judging from the amount of n-butyl lithium added at the first stage polymerization and the second stage polymerization, 0.0112 mol of lithium atom is calculated to be present in the reaction system. Thus, a mass amount of Vikoflex 7170 corresponding to 1.3 equivalents of lithium active terminals is calculated as illustrated below.

$$0.0112 \text{ (mol)} \times 1.3 \text{ (equivalent)} \times 1,000/10.4=1.4 \text{ g}$$

Finally, all of polymerization-active terminals were deactivated with methanol to obtain a polymerization solution (polymer concentration 25 mass %) of component A.

After deactivation with methanol, sampling was made, and the sampled polymerization solution was diluted with toluene, and the solution thus diluted was poured into a large amount of methanol to precipitate a polymer content which was then vacuum-dried to obtain a solid content of component A.

Next, component B was prepared in the following manner.

After washing a stainless-made polymer tank equipped with a jacket·stirrer and having an internal volume of 3 L with cyclohexane and substituted with nitrogen, 1,222 g of cyclohexane dehydrated to a water content of at most 6 ppm and containing 150 ppm of tetrahydrofuran was charged into the polymerization tank under nitrogen gas atmosphere, and 189 g of styrene dehydrated to at most 5 ppm of water content was added thereto. After raising an internal temperature to 50° C., 1.5 ml of a cyclohexane solution containing 10 mass % of n-butyl lithium was added thereto, and polymerization was effected for 20 minutes at such a temperature that the maximum temperature does not exceed 120° C. (first stage polymerization).

Thereafter, under a constant condition of an internal temperature of 50° C., 10.0 ml of a cyclohexane solution containing 10 mass % of n-butyl lithium and then 76 g of styrene dehydrated to a water content of at most 5 ppm were added thereto, and polymerization was effected for 20 minutes at such a temperature that the maximum temperature does not exceed 120° C. (second stage polymerization).

After finishing the second stage polymerization, sampling was made and the sampled polymerization solution was diluted with toluene, and the solution thus diluted was poured into a large amount of methanol to precipitate a polymer content which was then vacuum-dried to obtain a solid content. The solid content thus obtained was subjected to GPC measurement under measuring condition 1, and it was found that two kinds of polystyrene chains were present in the sampled material, and when a material having a higher number average molecular weight is represented by M3 and a material having a lower number average molecular weight is represented by M4, the respective number average molecular weights were M3=91100 and M4=6000.

Further, after raising the internal temperature to 80° C., 143 g of butadiene dehydrated by passing through a molecular sieve was added, and the polymerization was effected for 20 minutes at such a temperature that the maximum temperature does not exceed 120° C. (third stage polymerization).

After finishing the third stage polymerization, sampling was made, and the sampled polymerization solution was diluted with toluene, and the solution thus diluted was poured into a large amount of methanol to precipitate a polymer content which was then vacuum-dried to obtain a solid content. The solid content thus obtained was subjected to GPC measurement under measuring condition 2, and it was observed that two kinds of polymer chains (styrene-butadiene diblock copolymers having respectively different molecular weights) were present in the sampled material, and when a material having a higher number average molecular weight (polystyrene conversion value) is represented by M7 and a material having a lower number average molecular weight is represented by M8, the respective number average molecular weights were M7=118400 and M8=26700.

After finishing the successive polymerization, a solution having 1.5 g (corresponding to 1.1 equivalents) of epoxidized soybean oil "Vikoflex 7170" (ATOFINA CHEMICALS CO.) dissolved in 10 ml of cyclohexane was added under a constant condition of an internal temperature of 80° C. to carry out coupling reaction for 30 minutes (coupling step).

Finally, all of polymerization-active terminals were deactivated with methanol to obtain a polymerization solution (polymer concentration 25 mass %) of component B.

After deactivation with methanol, sampling was made, and the sampled polymerization solution was diluted with toluene, and the solution thus diluted was poured into a large amount of methanol to precipitate a polymer content which was then vacuum-dried to obtain a solid content of component B. Thereafter, 1,300 g of each of polymerization solutions of component A and component B was weighed respectively in an equal amount, and the two polymerization solutions were fully mixed. The polymerization solutions thus mixed were diluted with cyclohexane, and the solution thus mixed was poured into a large amount of methanol to precipitate a polymer content which was then vacuum-dried to obtain a powdery polymer.

Finally, after adding 0.2 mass part of 2,4-bis[(octylthio)methyl]-o-cresol as a stabilizer to 100 mass parts of the powdery polymer, the powdery polymer was charged into a 20 mm monoaxial extruder, and a melt strand was withdrawn from a dice at 210° C., and was cooled with water, and was then cut by a cutter to obtain pellet-like resin (block copolymer composition). Respective charged amounts are shown in Tables 1 and 5, and respective analyzed values are shown in Tables 2 to 4 and Tables 6 to 9, and evaluation results of solid physical properties are shown in Table 10.

EXAMPLES 2 TO 9 AND COMPARATIVE EXAMPLES 1 TO 8

Component A and component B were prepared and they were mixed to obtain pellet-like block copolymer composition in the same manner as in Example 1, except that polymerization tanks having such volumes and such charged amounts of starting materials as shown in Tables 1, 5, 12 and 16 were employed in Examples 2 to 9 and Comparative Examples 1 to 8. Various analytical values are shown in Tables 2 to 4, Tables 6 to 9, Tables 13 to 15 and Tables 17 to 20, and evaluation results of solid physical properties are shown in Tables 10 and 21.

GPC measurement after finishing the second stage polymerization was made under measuring condition 1, and GPC measurement after finishing the third stage polymerization was made under measuring condition 2, and the obtained component A, component B and block copolymer composition were subjected to gel permeation chromatogram measurement under measuring condition 2.

EXAMPLES 10 TO 18 AND COMPARATIVE EXAMPLES 9 TO 16

The block copolymer compositions obtained in Examples 1 to 9 and Comparative Examples 1 to 8 were respectively blended with general-purpose polystyrene (G14L manufactured by TOYO-STYRENE CO., LTD.) in such weight ratios of block copolymer composition/general-purpose polystyrene as shown in Tables 11 and 22, and each of the blended materials was charged into a 20 mm monoaxial extruder and melt strands were withdrawn from a dice at 230° C., and were cooled with water and were cut by a cutter to obtain pellet-like resin. Thereafter, their physical properties were evaluated in the same manner as in Example 1, and the results are shown in Tables 11 and 22.

TABLE 1

| Charge amounts of component A | | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| Volume of polymerization tank (L) | 3 | 3 | 3 | 3 | 3 | 10 | 3 | 10 | 10 |
| Solvent cyclohexane (g) | 1233 | 1225 | 1225 | 1166 | 1188 | 3952 | 1224 | 3950 | 3950 |
| Solvent/total monomer amount (wt ratio) | 3.0 | 3.0 | 3.0 | 2.3 | 2.6 | 2.6 | 3.0 | 2.6 | 2.6 |
| First stage n-BuLi 10% cyclohexane solution (ml) | 1.5 | 1.1 | 1.2 | 2.3 | 1.4 | 6.5 | 0.6 | 4.9 | 6.3 |
| First stage styrene (g) | 129 | 121 | 121 | 264 | 184 | 739 | 59 | 573 | 730 |
| Second stage n-BuLi 10% cyclohexane solution (ml) | 7.8 | 7.2 | 8.1 | 5.7 | 6.3 | 15.8 | 11.7 | 16.3 | 16 |
| Second stage styrene (g) | 171 | 161 | 161 | 146 | 161 | 409 | 212 | 574 | 417 |
| Butadiene (g) | 111 | 127 | 127 | 90 | 117 | 389 | 136 | 389 | 389 |
| Vikoflex7170 (g) | 1.4 | 1.3 | 1.3 | 1.0 | 1 | 3.6 | 1.7 | 3.7 | 3.6 |
| Equivalent number of Vikoflex7170 | 1.3 | 1.4 | 1.2 | 1.1 | 1.1 | 1.4 | 1.2 | 1.5 | 1.4 |

TABLE 2

| Analytical values of polymer content in component A produced by second stage polymerization | | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| GPC measuring condition of polymer content obtained after finishing second stage polymerization | 1 | 1 | 1 | 1 | 1 | 1 | 1 | 1 | 1 |
| Number average molecular weight M1 of component S1 in polymer content obtained after finishing second stage polymerization (M1 > M2) | 95300 | 85200 | 90100 | 136200 | 119200 | 149000 | 77300 | 145300 | 158100 |
| Number average molecular weight M2 of component S2 in polymer content obtained after finishing second stage polymerization (M1 > M2) | 15700 | 15600 | 16200 | 17100 | 18200 | 19500 | 16000 | 26000 | 20000 |
| Ratio M1/M2 | 6.1 | 5.5 | 5.6 | 8.0 | 6.5 | 7.6 | 4.8 | 5.6 | 7.9 |
| Molar ratio of component S1 providing number average molecular weight M1 in polymer content obtained after finishing second stage polymerization (M1 > M2) | 15 | 17 | 16 | 29 | 20 | 27 | 7 | 21 | 24 |
| Molar ratio of component S2 providing number average molecular weight M2 in polymer content obtained after finishing second stage polymerization (M1 > M2) | 85 | 83 | 84 | 71 | 80 | 73 | 93 | 79 | 76 |

TABLE 3

| Analytical values of polymer content in component A produced by third stage polymerization | | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| GPC measuring condition of polymer content obtained after finishing third stage polymerization | 2 | 2 | 2 | 2 | 2 | 2 | 2 | 2 | 2 |
| Number average molecular weight M5 of component S1-B1 in polymer content obtained after finishing third stage polymerization (M5 > M6) | 119500 | 114400 | 122000 | 161500 | 153200 | 199400 | 103300 | 192700 | 209800 |
| Number average molecular weight M6 of component S2-B1 in polymer content obtained after finishing third stage polymerization (M5 > M6) | 36300 | 40600 | 42700 | 39700 | 45900 | 57700 | 37800 | 62500 | 56400 |
| Number average molecular weight of polymer block B1 prepared from a conjugated diene as monomer | 12992 | 15718 | 16936 | 13891 | 17893 | 25694 | 13862 | 24331 | 25549 |

TABLE 4

Analytical values of component A

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| GPC measuring condition of obtained component A | 2 | 2 | 2 | 2 | 2 | 2 | 2 | 2 | 2 |
| Weight average molecular weight by GPC of obtained component A | 125300 | 131200 | 135200 | 196800 | 175300 | 218300 | 96800 | 196800 | 219000 |
| Number average molecular weight by GPC of obtained component A | 88800 | 94300 | 98100 | 131100 | 115800 | 154800 | 77500 | 138500 | 147000 |
| Molecular weight distribution by GPC of obtained component A | 1.41 | 1.39 | 1.38 | 1.50 | 1.51 | 1.41 | 1.25 | 1.42 | 1.49 |
| Content (%) of branched block copolymer component in component A | 80 | 71 | 71 | 83 | 79 | 77 | 65 | 70 | 76 |
| Ratio of mol number of ring-opened epoxy group residue present in epoxidized oil residue to total mol number of epoxy group and ring-opened epoxy group residue measured by NMR | 0.10 | 0.12 | 0.11 | 0.14 | 0.15 | 0.09 | 0.11 | 0.09 | 0.09 |
| PBd amount (%) | 27 | 31 | 31 | 18 | 25 | 25 | 33 | 25 | 25 |
| Polymer concentration (mass %) in polymerization solution of component A | 25 | 25 | 25 | 30 | 28 | 28 | 25 | 28 | 28 |

TABLE 5

Charge amounts of component B

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Volume of polymerization tank (L) | 3 | 3 | 3 | 3 | 10 | 3 | 10 | 3 | 3 |
| Solvent cyclohexane (g) | 1222 | 1228 | 1228 | 1141 | 3952 | 1186 | 4094 | 1185 | 1183 |
| Solvent/total monomer amount (wt ratio) | 3.0 | 3.0 | 3.0 | 2.3 | 2.6 | 2.6 | 3.0 | 2.6 | 2.6 |
| First stage n-BuLi 10% cyclohexane solution (ml) | 1.5 | 1.6 | 1.8 | 1.7 | 5.8 | 1.7 | 6.8 | 1.4 | 1.7 |
| First stage styrene (g) | 189 | 202 | 202 | 206 | 807 | 216 | 740 | 194 | 235 |
| Second stage n-BuLi 10% cyclohexane solution (ml) | 10 | 10.4 | 11.8 | 12.6 | 29.2 | 13.2 | 29.9 | 14.4 | 12.4 |
| Second stage styrene (g) | 76 | 81 | 81 | 123 | 341 | 129 | 218 | 150 | 108 |
| Butadiene (g) | 143 | 127 | 127 | 160 | 389 | 117 | 407 | 117 | 116 |
| Vikoflex7170 (g) | 1.5 | 1.9 | 1.6 | 1.7 | 4.7 | 2.4 | 5.1 | 2.8 | 2.5 |
| Equivalent number of Vikoflex7170 | 1.1 | 1.4 | 1.0 | 1.0 | 1.2 | 1.4 | 1.2 | 1.5 | 1.5 |

TABLE 6

Analytical values of polymer content in component B produced by second stage polymerization

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| GPC measuring condition of polymer content obtained after finishing second stage polymerization | 1 | 1 | 1 | 1 | 1 | 1 | 1 | 1 | 1 |
| Number average molecular weight M3 of component S3 in polymer content obtained after finishing second stage polymerization (M3 > M4) | 91100 | 93200 | 123800 | 102300 | 138100 | 126600 | 111500 | 123400 | 150400 |
| Number average molecular weight M4 of component S4 in polymer content obtained after finishing second stage polymerization (M3 > M4) | 6000 | 5400 | 6000 | 7400 | 8800 | 8200 | 5900 | 8300 | 6900 |
| Ratio M3/M4 | 15.2 | 17.3 | 20.6 | 13.8 | 15.7 | 15.4 | 18.9 | 14.9 | 21.8 |
| Molar ratio of component S3 providing number average molecular weight M3 in polymer content obtained after finishing second stage polymerization (M3 > M4) | 21 | 17 | 13 | 13 | 16 | 12 | 19 | 10 | 11 |
| Molar ratio of component S4 providing number average molecular weight M4 in polymer content obtained after finishing second stage polymerization (M3 > M4) | 79 | 83 | 87 | 87 | 84 | 88 | 81 | 90 | 89 |

TABLE 7

Analytical values of polymer content in component B produced by third stage polymerization

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| GPC measuring condition of polymer content obtained after finishing third stage polymerization | 2 | 2 | 2 | 2 | 2 | 2 | 2 | 2 | 2 |
| Number average molecular weight M7 of component S3-B2 in polymer content obtained after finishing third stage polymerization (M7 > M8) | 118400 | 119800 | 152300 | 131500 | 170400 | 154200 | 142600 | 140600 | 178400 |
| Number average molecular weight M8 of component S4-B2 in polymer content obtained after finishing third stage polymerization (M7 > M8) | 26700 | 24300 | 25100 | 27800 | 29700 | 25400 | 28400 | 22700 | 23100 |
| Number average molecular weight of polymer block B2 prepared from a conjugated diene as a monomer | 13920 | 13195 | 13804 | 14384 | 15428 | 12992 | 15544 | 9164 | 12818 |

TABLE 8

Analytical values of component B

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| GPC measuring condition of obtained component B | 2 | 2 | 2 | 2 | 2 | 2 | 2 | 2 | 2 |
| Weight average molecular weight by GPC of obtained component B | 140100 | 127100 | 148200 | 139800 | 177500 | 135900 | 158500 | 113600 | 157000 |
| Number average molecular weight by GPC of obtained component B | 93600 | 81300 | 86500 | 89600 | 109000 | 79100 | 102100 | 63100 | 80700 |
| Molecular weight distribution by GPC of obtained component B | 1.50 | 1.56 | 1.71 | 1.56 | 1.63 | 1.72 | 1.55 | 1.80 | 1.95 |
| Content (%) of branched block copolymer component in component B | 85 | 83 | 85 | 82 | 81 | 79 | 82 | 78 | 86 |
| Ratio of mol number of ring-opened epoxy group residue present in epoxidized oil residue to total mol number of epoxy group and ring-opened epoxy group residue measured by NMR | 0.14 | 0.11 | 0.15 | 0.14 | 0.14 | 0.10 | 0.11 | 0.10 | 0.11 |
| PBd amount (%) | 35 | 31 | 31 | 33 | 25.3 | 25.3 | 29.8 | 25.3 | 25.3 |
| Polymer concentration (mass %) in polymerization solution of component B | 25 | 25 | 25 | 30 | 28 | 28 | 25 | 28 | 28 |

TABLE 9

Analytical values of obtained block copolymer mixture

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Mass (g) of mixed polymerization solution of component A | 1300 | 1300 | 1300 | 1300 | 1300 | 1300 | 1300 | 1300 | 1300 |
| Mass (g) of mixed polymerization solution of component B | 1300 | 1300 | 1300 | 1300 | 2600 | 1300 | 2600 | 1300 | 1300 |
| Mass ratio of component A/component B | 1/1 | 1/1 | 1/1 | 1/1 | 1/2 | 1/1 | 1/2 | 1/1 | 1/1 |
| GPC measuring condition of obtained block copolymer mixture | 2 | 2 | 2 | 2 | 2 | 2 | 2 | 2 | 2 |
| Weight average molecular weight by GPC of obtained block copolymer mixture | 127000 | 128600 | 146800 | 172000 | 180300 | 177000 | 136300 | 156800 | 187100 |
| Number average molecular weight by GPC of obtained block copolymer mixture | 84500 | 85700 | 93100 | 108900 | 114700 | 104500 | 88200 | 89400 | 103800 |
| Molecular weight distribution by GPC of obtained block copolymer mixture | 1.50 | 1.50 | 1.58 | 1.58 | 1.57 | 1.69 | 1.55 | 1.75 | 1.80 |
| Ratio of mol number of ring-opened epoxy group residue present in epoxidized oil residue to total mol number of epoxy group and ring-opened epoxy group residue measured by NMR | 0.12 | 0.11 | 0.13 | 0.14 | 0.14 | 0.10 | 0.11 | 0.10 | 0.10 |
| PBd amount (%) | 31 | 31 | 31 | 25 | 25 | 25 | 31 | 25 | 25 |

TABLE 10

Measurement results of physical properties of block copolymer mixture

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| MFR (g/10 min) | 9.3 | 9.5 | 6.6 | 4.1 | 2.8 | 2.5 | 8.7 | 4.3 | 2 |
| Cloudiness (%) | 1.8 | 1.8 | 1.9 | 1.5 | 1.3 | 1.4 | 1.8 | 1.3 | 1.6 |
| Total light transmittance (%) | 89.3 | 89.2 | 89 | 90 | 91 | 90 | 89.1 | 91 | 89 |
| Total absorption energy (J) | 13 | 12 | 13.5 | 12.5 | 13.4 | 11.7 | 15 | 11.5 | 15.4 |
| Charpy impact strength (kJ/m) | 6.5 | 6 | 6.7 | 5.7 | 6.3 | 5.1 | 7.7 | 6.1 | 9.8 |

TABLE 11

Measurement results of physical properties of blended products of block copolymer mixture and general-purpose polystyrene

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Kinds of used block copolymer mixture | Polymer of Ex. 1 | Polymer of Ex. 2 | Polymer of Ex. 3 | Polymer of Ex. 4 | Polymer of Ex. 5 | Polymer of Ex. 6 | Polymer of Ex. 7 | Polymer of Ex. 8 | Polymer of Ex. 9 |
| Mass ratio of block copolymer mixture/general-purpose polystyrene | 60/40 | 60/40 | 60/40 | 80/20 | 80/20 | 80/20 | 60/40 | 80/20 | 80/20 |
| MFR (g/10 min) | 7.2 | 7.8 | 6.2 | 4.2 | 3.3 | 3.1 | 7.5 | 4.8 | 2.8 |
| Haze (%) | 7.1 | 7 | 8 | 3.8 | 2.9 | 3.8 | 8 | 2.4 | 4 |
| Total light transmittance (%) | 82 | 81.7 | 81 | 86.1 | 87.5 | 86.8 | 80.2 | 88 | 86.3 |
| Total absorption energy (J) | 11.1 | 7.5 | 11.2 | 2.5 | 3.5 | 3.2 | 12.1 | 3 | 12.8 |
| Charpy impact strength (kJ/m) | 1.4 | 1.3 | 1.5 | 1.3 | 1.3 | 1.3 | 1.4 | 1.3 | 1.4 |

TABLE 12

Charge amounts of component A

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Volume of polymerization tank (L) | 3 | 3 | 3 | 3 | 3 | 3 | 3 | 3 |
| Solvent cyclohexane (g) | 1227 | 1166 | 1163 | 1237 | 1229 | 1228 | 1225 | 1227 |
| Solvent/total monomer amount (wt ratio) | 3.0 | 2.3 | 2.3 | 3.0 | 3.0 | 3.0 | 3.0 | 3.0 |
| First stage n-BuLi 10% cyclohexane solution (ml) | 1.5 | 0.7 | 1.3 | 0.9 | 2.3 | 1.3 | 2.3 | 0.8 |
| First stage styrene (g) | 135 | 78 | 194 | 141 | 132 | 143 | 191 | 39 |
| Second stage n-BuLi 10% cyclohexane solution (ml) | 6.2 | 6.1 | 7.5 | 6.1 | 10.7 | 7 | 2.7 | 11.7 |
| Second stage styrene (g) | 147 | 336 | 206 | 187 | 150 | 139 | 90 | 243 |
| Butadiene (g) | 127 | 86 | 99 | 85 | 127 | 127 | 127 | 127 |
| Vikoflex7170 (g) | 1.0 | 0.8 | 1.1 | 1.0 | 1.7 | 2.6 | 0.3 | 1.6 |
| Equivalent number of Vikoflex7170 | 1.1 | 1.0 | 1.1 | 1.2 | 1 | 3 | 1 | 1 |

TABLE 13

Analytical values of polymer content in component A produced by second stage polymerization

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| GPC measuring condition of polymer content obtained after finishing second stage polymerization | 1 | 1 | 1 | 1 | 1 | 1 | 1 | 1 |
| Number average molecular weight M1 of component S1 in polymer content obtained after finishing second stage polymerization (M1 > M2) | 86400 | 147300 | 172500 | 144600 | 61000 | 152000 | 95000 | 96000 |
| Number average molecular weight M2 of component S2 in polymer content obtained after finishing second stage polymerization (M1 > M2) | 15300 | 53400 | 21600 | 24500 | 10000 | 15100 | 17300 | 17500 |
| Ratio M1/M2 | 5.6 | 2.8 | 8.0 | 5.9 | 6.1 | 10.1 | 5.5 | 5.5 |
| Molar ratio of component S1 providing number average molecular weight M1 in polymer content obtained after finishing second stage polymerization (M1 > M2) | 21 | 11 | 13 | 14 | 15 | 10 | 41 | 3 |

TABLE 13-continued

Analytical values of polymer content in component A produced by second stage polymerization

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Molar ratio of component S2 providing number average molecular weight M2 in polymer content obtained after finishing second stage polymerization (M1 > M2) | 79 | 89 | 87 | 86 | 85 | 90 | 59 | 97 |

TABLE 14

Analytical values of polymer content in component A produced by third stage

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| GPC measuring condition of polymer content obtained after finishing third stage polymerization | 2 | 2 | 2 | 2 | 2 | 2 | 2 | 2 |
| Number average molecular weight M5 of component S1-B1 in polymer content obtained after finishing third stage polymerization (M5 > M6) | 117400 | 193000 | 210500 | 180200 | 86500 | 202000 | 151000 | 129000 |
| Number average molecular weight M6 of component S2-B1 in polymer content obtained after finishing third stage polymerization (M5 > M6) | 43200 | 82000 | 44300 | 46300 | 25500 | 39800 | 59200 | 33000 |
| Number average molecular weight of polymer block B1 prepared from a conjugated diene as a monomer | 17081 | 21547 | 17603 | 16646 | 11890 | 21663 | 28391 | 14065 |

TABLE 15

Analytical values of component A

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| GPC measuring condition of obtained component A | 2 | 2 | 2 | 2 | 2 | 2 | 2 | 2 |
| Weight average molecular weight by GPC of obtained component A | 162000 | 205600 | 193700 | 171600 | 153000 | 173000 | 173000 | 159000 |
| Number average molecular weight by GPC of obtained component A | 121300 | 153600 | 124100 | 118200 | 108000 | 123000 | 110300 | 129000 |
| Molecular weight distribution by GPC of obtained component A | 1.34 | 1.34 | 1.56 | 1.45 | 1.42 | 1.41 | 1.57 | 1.23 |
| Content (%) of branched block copolymer component in component A | 73 | 82 | 81 | 78 | 75 | 77 | 70 | 74 |
| Ratio of mol number of ring-opened epoxy group residue present in epoxidized oil residue to total mol number of epoxy group and ring-opened epoxy group residue measured by NMR | 0.14 | 0.14 | 0.15 | 0.10 | 0.14 | 0.02 | 0.85 | 0.14 |
| PBd amount (%) | 31 | 17 | 20 | 21 | 31 | 31 | 31 | 31 |
| Polymer concentration (mass %) in polymerization solution of component A | 25 | 30 | 30 | 25 | 25 | 25 | 25 | 25 |

TABLE 16

Charge amounts of component B

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Volume of polymerization tank (L) | 3 | 3 | 3 | 3 | 3 | 3 | 3 | 3 |
| Solvent cyclohexane (g) | 1227 | 1152 | 1155 | 1228 | 1225 | 1227 | 1226 | 1229 |
| Solvent/total monomer amount (wt ratio) | 3.0 | 2.3 | 2.3 | 3.0 | 3.0 | 3.0 | 3.0 | 3.0 |
| First stage n-BuLi 10% cyclohexane solution (ml) | 1.5 | 1.6 | 1.8 | 1.3 | 2.8 | 1.4 | 2.5 | 1.1 |

TABLE 16-continued

| | Charge amounts of component B | | | | | | | |
|---|---|---|---|---|---|---|---|---|
| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| First stage styrene (g) | 147 | 253 | 240 | 212 | 218 | 147 | 235 | 77 |
| Second stage n-Buli 10% cyclohexane solution (ml) | 14 | 8 | 10 | 8 | 15.3 | 15 | 3 | 20.8 |
| Second stage styrene (g) | 135 | 119 | 126 | 85 | 63 | 135 | 47 | 205 |
| Butadiene (g) | 127 | 122 | 129 | 112 | 127 | 127 | 127 | 127 |
| Vikoflex7170 (g) | 1.9 | 1.2 | 1.4 | 1.1 | 2.3 | 5.1 | 0.4 | 2.8 |
| Equivalent number of Vikoflex7170 | 1.1 | 1.1 | 1.0 | 1.0 | 1.1 | 2.7 | 0.6 | 1.1 |

TABLE 17

Analytical values of polymer content in component B produced by second stage polymerization

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| GPC measuring condition of polymer content obtained after finishing second stage polymerization | 1 | 1 | 1 | 1 | 1 | 1 | 1 | 1 |
| Number average molecular weight M3 of component S3 in polymer content obtained after finishing second stage polymerization (M3 > M4) | 102800 | 169200 | 148000 | 162200 | 71500 | 111000 | 111100 | 102000 |
| Number average molecular weight M4 of component S4 in polymer content obtained after finishing second stage polymerization (M3 > M4) | 8800 | 12200 | 9800 | 8800 | 3100 | 8300 | 8400 | 9100 |
| Ratio (M3 > M4) | 11.7 | 13.9 | 15.1 | 18.4 | 23.1 | 13.4 | 13.2 | 11.2 |
| Molar ratio of component S3 providing number average molecular weight M3 in polymer content obtained after finishing second stage polymerization (M3 > M4) | 12 | 15 | 12 | 13 | 13 | 11 | 40 | 3 |
| Molar ratio of component S4 providing number average molecular weight M4 in polymer content obtained after finishing second stage polymerization (M3 > M4) | 88 | 85 | 88 | 87 | 87 | 89 | 60 | 97 |

TABLE 18

Analytical values of polymer content in component B produced by third stage polymerization

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| GPC measuring condition of polymer content obtained after finishing third stage polymerization | 2 | 2 | 2 | 2 | 2 | 2 | 2 | 2 |
| Number average molecular weight M7 of component S3-B2 in polymer content obtained after finishing third stage polymerization (M7 > M8) | 126600 | 210900 | 184500 | 196800 | 84500 | 129500 | 148000 | 119200 |
| Number average molecular weight M8 of component S4-B2 in polymer content obtained after finishing third stage polymerization (M7 > M8) | 25000 | 38400 | 31600 | 32300 | 14500 | 24700 | 45900 | 17500 |
| Number average molecular weight of polymer block B2 prepared from a conjugated diene as a monomer | 11600 | 19691 | 16907 | 16849 | 7076 | 10121 | 21576 | 7424 |

TABLE 19

Analytical values of component B

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| GPC measuring condition of obtained component B | 2 | 2 | 2 | 2 | 2 | 2 | 2 | 2 |
| Weight average molecular weight by GPC of obtained component B | 114700 | 219200 | 183500 | 200300 | 108000 | 113000 | 115000 | 121000 |
| Number average molecular weight by GPC of obtained component B | 74300 | 130400 | 108800 | 114200 | 65000 | 73300 | 67000 | 89000 |
| Molecular weight distribution by GPC of obtained component B | 1.54 | 1.68 | 1.69 | 1.75 | 1.66 | 1.54 | 1.72 | 1.36 |
| Content (%) of branched block copolymer component in component B | 85 | 81 | 81 | 81 | 82 | 84 | 77 | 83 |
| Ratio of mol number of ring-opened epoxy group residue present in epoxidized oil residue to total mol number of epoxy group and ring-opened epoxy group residue measured by NMR | 0.14 | 0.15 | 0.14 | 0.14 | 0.14 | 0.02 | 0.9 | 0.14 |
| PBd amount (%) | 31 | 25 | 26 | 27 | 31 | 31 | 31 | 31 |
| Polymer concentration (mass %) in polymerization solution of component B | 25 | 30 | 30 | 25 | 25 | 25 | 25 | 25 |

TABLE 20

Analytical values of obtained block copolymer mixture

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Mass (g) of mixed polymerization solution of component A | 1300 | 1300 | 1300 | 1300 | 1300 | 1300 | 1300 | 1300 |
| Mass (g) of mixed polymerization solution of component A | 1300 | 1300 | 1300 | 1300 | 1300 | 1300 | 1300 | 1300 |
| Mass ratio of component A/component B | 1/1 | 1/1 | 1/1 | 1/1 | 1/1 | 1/1 | 1/1 | 1/1 |
| GPC measuring condition of obtained block polymer mixture | 2 | 2 | 2 | 2 | 2 | 2 | 2 | 2 |
| Weight average molecular weight by GPC of obtained block copolymer mixture | 139800 | 207900 | 192300 | 186100 | 125000 | 147000 | 141000 | 140500 |
| Number average molecular weight by GPC of obtained block copolymer | 92100 | 123300 | 115600 | 119500 | 83500 | 96500 | 84500 | 115000 |
| Molecular weight distribution by GPC of obtained block copolymer mixture | 1.52 | 1.69 | 1.66 | 1.56 | 1.50 | 1.52 | 1.67 | 1.22 |
| Ratio of mol number of ring-opened epoxy group residue present in epoxidized oil residue to total mol number of epoxy group and ring-opened epoxy group residue measured by NMR | 0.15 | 0.14 | 0.14 | 0.12 | 0.14 | 0.02 | 0.87 | 0.14 |
| PBd amount (%) | 31 | 21 | 23 | 24 | 31 | 31 | 31 | 31 |

TABLE 21

Measurement results of physical properties of block copolymer

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| MFR (g/10 min) | 7.6 | 1 | 2.2 | 1.8 | 13 | 5.5 | 9.5 | 7.4 |
| Haze (%) | 1.5 | 2.1 | 1.5 | 1.9 | 1.4 | 1.8 | 1.8 | 1.3 |
| Total light transmittance (%) | 89.3 | 89.9 | 90.8 | 88.9 | 89.7 | 88.7 | 89 | 89.9 |
| Total absorption energy (J) | 3 | 2 | 3 | 2 | 1 | 0.9 | 0.8 | 0.5 |
| Charpy impact strength (kJ/m) | 1 | 0.8 | 1.1 | 1.1 | 0.5 | 0.7 | 0.6 | 0.5 |

TABLE 22

Measurement results of physical properties of blended products of block copolymer mixture and general-purpose polystyrene

| | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|
| Kinds of used block copolymer mixture | Polymer of Comp. Ex. 1 | Polymer of Comp. Ex. 2 | Polymer of Comp. Ex. 3 | Polymer of Comp. Ex. 4 | Polymer of Comp. Ex. 5 | Polymer of Comp. Ex. 6 | Polymer of Comp. Ex. 7 | Polymer of Comp. Ex. 8 |
| Mass ratio of block copolymer mixture/general-purpose polystyrene | 60/40 | 80/20 | 80/20 | 80/20 | 60/40 | 60/40 | 60/40 | 60/40 |
| MFR (g/10 min) | 7.1 | 1.5 | 2.8 | 2.2 | 11 | 6.9 | 8.1 | 7.2 |
| Haze (%) | 6.8 | 4.9 | 3.8 | 6.5 | 7.5 | 8.5 | 9.9 | 6.9 |
| Total light transmittance (%) | 81.8 | 88.2 | 86.1 | 85.6 | 80.2 | 78.9 | 78.2 | 81.2 |
| Total absorption energy (J) | 1.7 | 0.7 | 1 | 1 | 0.7 | 0.8 | 0.7 | 0.4 |
| Charpy impact strength (kJ/m) | 1.3 | 1.5 | 1.1 | 1.3 | 0.4 | 0.7 | 0.7 | 0.5 |

INDUSTRIAL APPLICABILITY

The block copolymer composition of the present invention is useful as modifiers for various thermoplastic resins and thermosetting resins, base materials for shoes, base materials for self-adhesives·adhesives, modifiers for asphalt, modifiers for electric wire cables, modifiers for vulcanized rubbers and the like, to which conventional block copolymers have been applicable.

Particularly, a composition prepared by blending the block copolymer composition of the present invention with various thermoplastic resins is useful as a base material for a sheet and a film, and is effectively usable as wrapping materials or containers for foods and daily goods, and also as laminate sheet·films, which are excellent in transparency, impact resistance and low temperature properties.

The invention claimed:

1. A block copolymer composition which is a block copolymer composition comprising, as monomer units, from 55 to 95 mass % of a vinyl aromatic hydrocarbon and from 5 to 45 mass % of a conjugated diene, which composition contains the following components A and B in a blend ratio within a range of component A/component B=20 to 80/80 to 20 (mass ratio):

Component A is a block copolymer
(1) which comprises, as monomer units, from 55 to 95 mass % of a vinyl aromatic hydrocarbon and from 5 to 45 mass % of a conjugated diene,
(2) which is constituted by a hard segment block made mainly of the vinyl aromatic hydrocarbon and a soft segment block made mainly of the conjugated diene,
(3) wherein the hard segment block comprises blocks S1 and S2 made mainly of a vinyl aromatic hydrocarbon having two types of different molecular weights, and when the number average molecular weights of S1 and S2 are represented by M1 and M2, respectively, M1 is within a range of from 75,000 to 170,000 and M2 is within a range of from 14,000 to 30,000, and their ratio M1/M2 is within a range of from 4 to 9, and the ratio of S1 to S2 is within a range of S1/S2=6 to 35/65 to 94 (molar ratio), and
(4) which is produced by a coupling reaction; and
component B is a block copolymer
(1) which comprises, as monomer units, from 55 to 95 mass % of a vinyl aromatic hydrocarbon and from 5 to 45 mass % of a conjugated diene,
(2) which is constituted by a hard segment block made mainly of the vinyl aromatic hydrocarbon and a soft segment block made mainly of the conjugated diene,
(3) wherein the hard segment block comprises blocks S3 and S4 made mainly of a vinyl aromatic hydrocarbon having two types of different molecular weights, and when the number average molecular weights of S3 and S4 are represented by M3 and M4, respectively, M3 is within a range of from 80,000 to 160,000 and M4 is within a range of from 4,000 to 12,000 and their ratio M3/M4 is within a range of from 13 to 22, and the ratio of S3 to S4 is within a range of S3/S4=5 to 30/70 to 95 (molar ratio), and
(4) which is produced by a coupling reaction.

2. The block copolymer composition according to claim 1, wherein component A is a mixture of three types of block copolymers as identified in the following (1), and component (B) is a mixture of three types of block copolymers as identified in the following (2):

$$S1-B1, S2-B1, (S1-B1)i-X-(B1-S2)m \quad (1)$$

(wherein each of S1 and S2 represents a hard segment block made mainly of a vinyl aromatic hydrocarbon, Bi represents a soft segment block made mainly of a conjugated diene, the number average molecular weight of B1 is within a range of from 10,000 to 30,000, X is a residual group of a coupling agent, each of i and m is an integer of 0 or more, and i+m is at least 1 and at most 8);

$$S3-B2, S4-B2, (S3-B2)n-Y-(B2-S4)o \quad (2)$$

(wherein each of S3 and S4 is a hard segment block made mainly of a vinyl aromatic hydrocarbon, B2 represents a soft segment block made mainly of a conjugated diene, the number average molecular weight of B2 is within a range of from 9,000 to 20,000, Y is a residual group of a coupling agent, each of n and o is an integer of 0 or more, and n+o is at least 1 and at most 8).

3. The block copolymer composition according to claim 1, wherein components A and B are block copolymers obtained by coupling by means of an epoxidized oil.

4. The block copolymer composition according to claim 3, wherein the epoxidized oil is epoxidized soybean oil.

5. The block copolymer composition according to claim 3, wherein the ratio of the molar amount of residual groups of ring opened epoxy groups present in the epoxidized oil residual groups in the block copolymer composition comprising components A and B is less than 0.7 to the molar amount of the total of epoxy groups and said residual groups of ring opened epoxy groups, present in the epoxidized oil residual groups.

6. The block copolymer composition according to claim 1, wherein components A and B are mixed in a solution state.

7. A thermoplastic resin composition comprising the block copolymer composition according to claim 1, and another thermoplastic resin.

8. A molded product made of the block copolymer composition according to claim 1.

9. The block copolymer composition according to claim 2, wherein components A and B are block copolymers obtained by coupling by means of an epoxidized oil.

10. The block copolymer composition according to claim 9, wherein the epoxidized oil is epoxidized soybean oil.

11. The block copolymer composition according to claim 4, wherein the ratio of the molar amount of residual groups of ring opened epoxy groups present in the epoxidized oil residual groups in the block copolymer composition comprising components A and B is less than 0.7 to the molar amount of the total of epoxy groups and said residual groups of ring opened epoxy groups, present in the epoxidized oil residual groups.

12. The block copolymer composition according to claim 9, wherein the ratio of the molar amount of residual groups of ring opened epoxy groups present in the epoxidized oil residual groups in the block copolymer composition comprising components A and B is less than 0.7 to the molar amount of the total of epoxy groups and said residual groups of ring opened epoxy groups, present in the epoxidized oil residual groups.

13. The block copolymer composition according to claim 10, wherein the ratio of the molar amount of residual groups of ring opened epoxy groups present in the epoxidized oil residual groups in the block copolymer composition comprising components A and B is less than 0.7 to the molar amount of the total of epoxy groups and said residual groups of ring opened epoxy groups, present in the epoxidized oil residual groups.

14. A molded product made of the thermoplastic resin composition according to claim 7.

* * * * *